United States Patent [19]

Loomis

[11] 4,265,577
[45] May 5, 1981

[54] TWO-PIECE CURTAIN-LIKE LADING-RESTRAINING DEVICE

[75] Inventor: Russell M. Loomis, Palos Heights, Ill.

[73] Assignee: Unarco Industries, Inc., Chicago, Ill.

[21] Appl. No.: 44,054

[22] Filed: May 31, 1979

[51] Int. Cl.³ ............................................. B60P 7/00
[52] U.S. Cl. ................................... 410/118; 105/370; 410/130; 410/140
[58] Field of Search .................. 105/370; 410/96, 104, 410/105, 108, 109, 112, 115, 121, 127, 129, 130, 135, 140, 118

[56] References Cited

U.S. PATENT DOCUMENTS

| | | | |
|---|---|---|---|
| 276,053 | 4/1883 | Lewis | 410/129 X |
| 2,605,064 | 7/1952 | Davis | 410/104 |
| 2,752,864 | 7/1956 | McDougal, Sr. et al. | 410/130 |
| 3,376,599 | 4/1968 | Singer | 410/130 X |
| 3,399,635 | 9/1968 | Heard | 410/104 |
| 3,431,015 | 3/1969 | Breen et al. | 410/129 X |
| 3,831,976 | 8/1974 | Iden, Sr. | 410/104 |

Primary Examiner—John J. Love
Assistant Examiner—Michael Mar
Attorney, Agent, or Firm—Norman Lettvin; Gerald S. Geren

[57] ABSTRACT

A curtain-type lading-restraining device for use in lading-carrying containers which employs decking which is positionable above the floor of the container so as to provide two surfaces for supporting cargo.

The lading-restraining curtain includes an upper curtain assembly for positioning above the decking and for cooperation with the cargo on the decking. The upper curtain assembly is suspended from a trolley positioned adjacent the ceiling of the vehicle container.

Track channels are provided in each of the sidewalls below the decking for supporting the lower curtain. Sliders are positioned in each of the channels for longitudinal movement therein and for supporting the lower curtain. The lower curtain is connected to the slider through a link chain system and can be positioned to engage cargo on the floor of the container. One end of the support chain includes a detachable hook so that one end of the lower curtain can be stored on the opposite side of the container.

4 Claims, 7 Drawing Figures

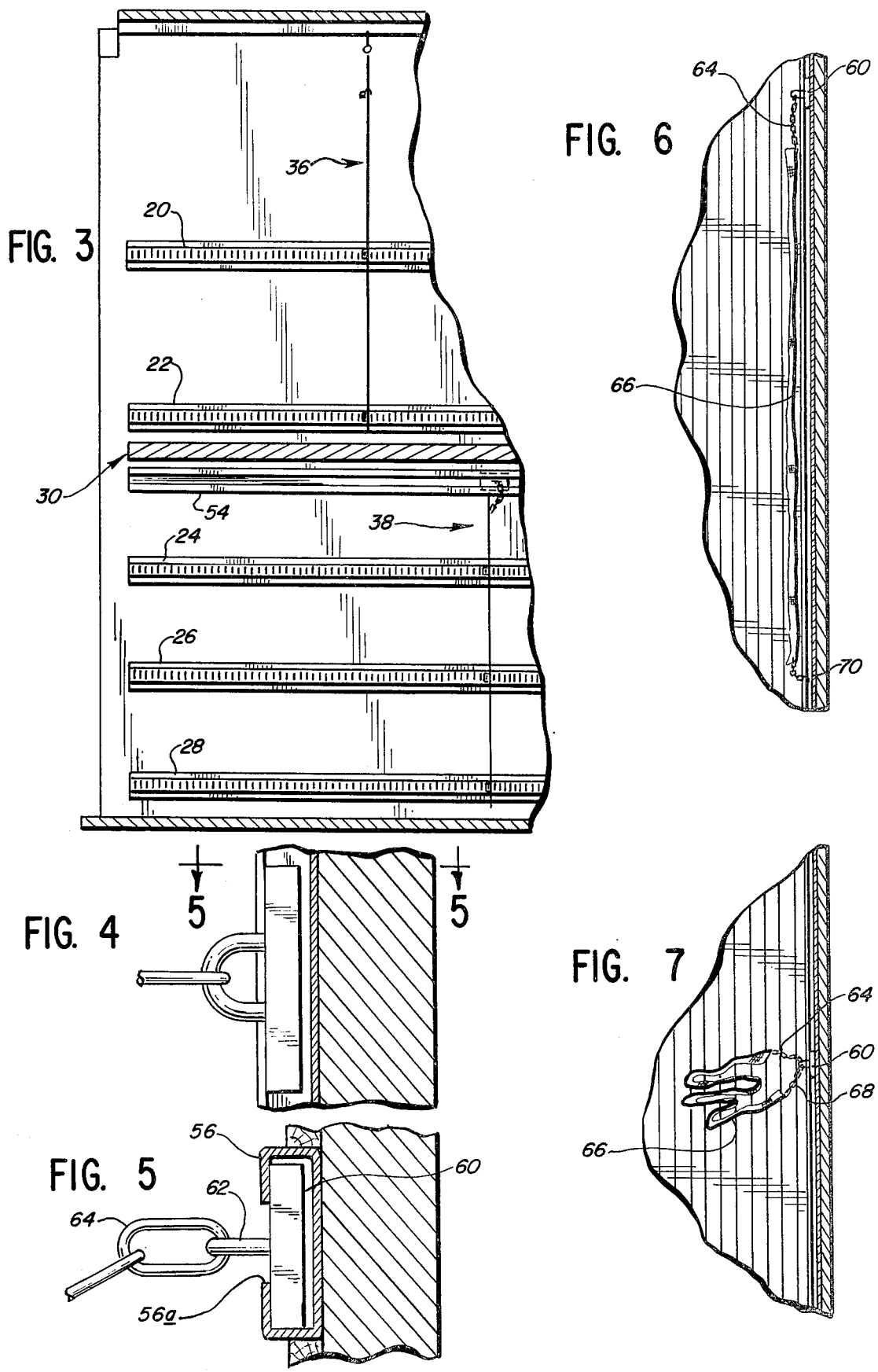

TWO-PIECE CURTAIN-LIKE LADING-RESTRAINING DEVICE

BACKGROUND OF THE INVENTION

This invention relates to load restrainers, and more particularly, to load-restraining devices for use in lading-carrying vehicles and/or containers.

Curtain-type load-restraining systems for use in lading-carrying vehicles, such as truck trailers which have longitudinal top, side and bottom walls are disclosed in U.S. Pat. No. Re. 28,788. Such systems include: (1) a plurality of vertically-spaced fasteners or belt rails positioned along the sidewalls of the vehicle; (2) a curtain support which extends transversely across the vehicle adjacent the top wall and which is movable longitudinally within the trailer; (3) flexible lading-engaging curtain which is suspended from the support and extends across the width and height of the vehicle between the side walls and the top and bottom walls; and (4) horizontal load-restraining belts carried by the curtain and having fasteners at the end thereof for connection to vertically-spaced sidewall fasteners.

In some vehicles horizontal decking is employed so as to define a second surface upon which lading may be carried. One such system is shown in U.S. Pat. No. Re. 27,034.

It has been determined to be desirable to employ lading-restraining curtains in vehicles which employ decking systems. However, the present style curtain-type restraints are not suitable since the face of the lading on the floor may be substantially offset from the face of the lading on the deck.

It is therefore an object of this invention to provide a load-restraining curtain for use with lading-carrying vehicles or containers that employ decking systems.

This and other objects of this invention will become readily apparent from the following description and appended claims.

SUMMARY OF THE INVENTION

There is provided by this invention a curtain system for use in lading-carrying vehicles or containers that employ decking systems. The lading-engaging curtain means includes an upper curtain and a lower curtain with the upper curtain being suspended from adjacent the ceiling by a movable trolley and extending downwardly from the ceiling to the deck level. Appropriate belt means are provided for securing the upper curtain to the sidewalls of the vehicle.

The lower curtain system includes a pair of horizontal tracks in each of the side walls of the vehicle which are positioned below the decking. Sliders are mounted in the track, and the lower curtain is detachably secured to the sliders for positioning adjacent the face of the lading on the floor.

This system of independent upper and lower curtains permits restraining of loads where the upper and lower lading faces are substantially offset.

BRIEF DESCRIPTION OF THE DRAWINGS

FIG. 3 is a side elevational view showing further details of construction and the positioning of the curtain system;

FIG. 4 is a plan view showing a track channel and slider for supporting one side of the lower curtain;

FIG. 5 is a vertical view taken substantially along line 5—5 in FIG. 4 showing the track and slider;

FIG. 6 is a plan view showing one method of storing the lower curtain; and

FIG. 7 is a plan view showing another technique for storing the lower curtain.

DESCRIPTION OF THE PREFERRED EMBODIMENT

Figure 1:
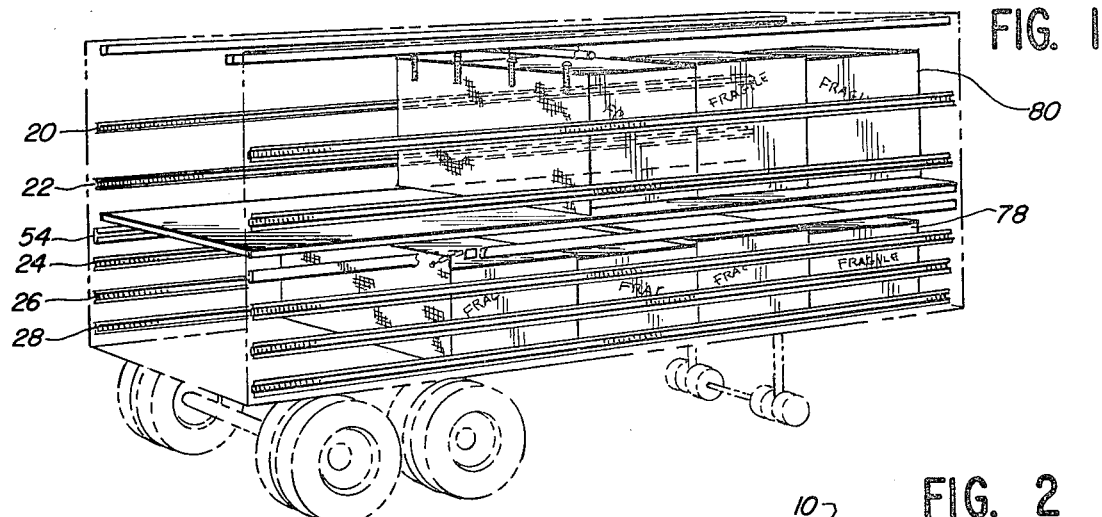
FIG. 1 is a perspective view of a truck-trailer showing a decking system and the curtain system of this invention.
Figure 2:
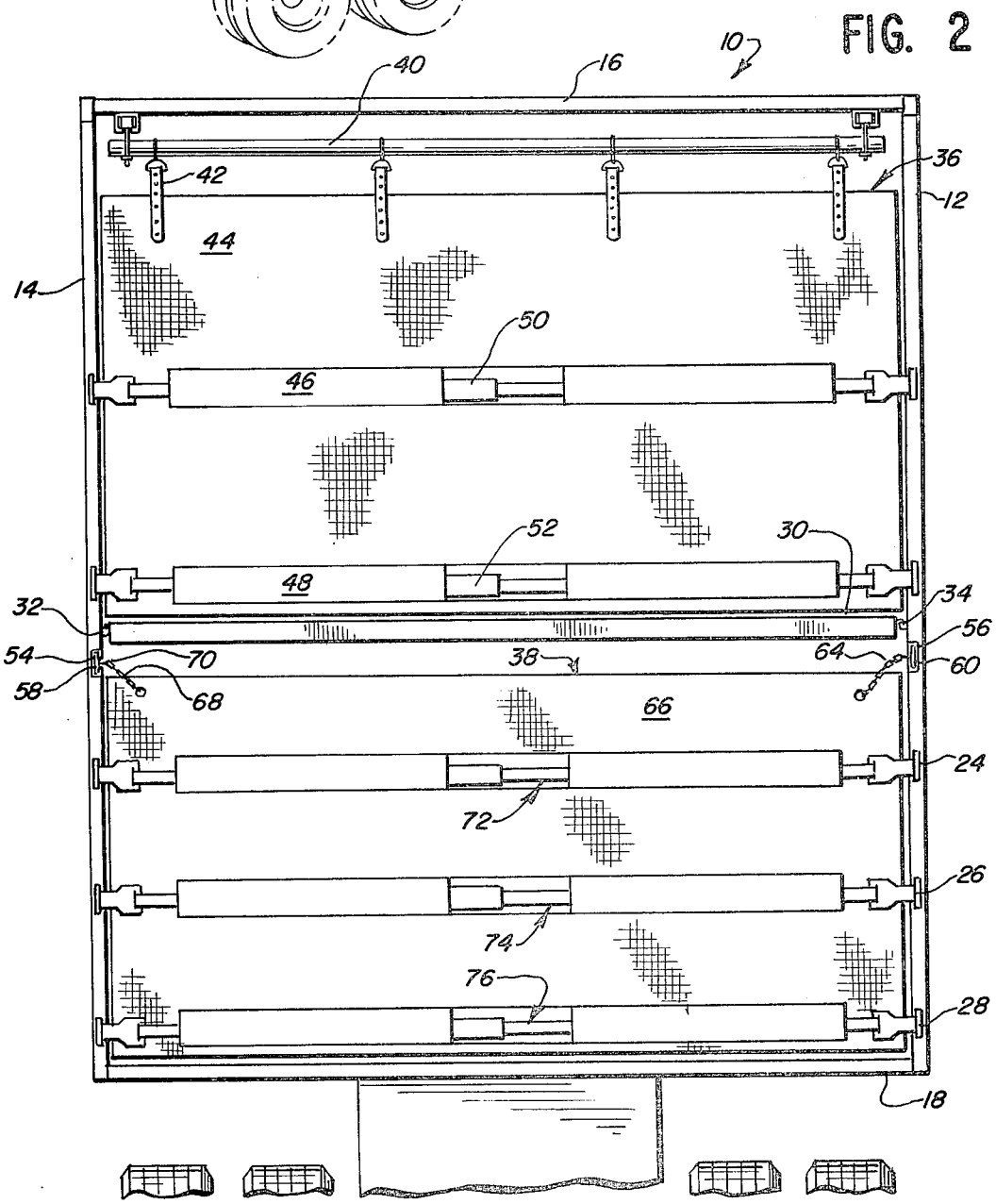
FIG. 2 is an elevational view taken from the rear end of a trailer and showing the decking system and curtain system in place.

Referring now to the drawings, there is shown a truck-trailer 10 which includes a pair of sidewalls 12 and 14, a top wall or ceiling 16, and a bottom wall or floor 18.

Five pairs of longitudinally-extending belt rails 20, 22, 24, 26 and 28 are mounted on the sidewalls of the trailer. Each of the rails includes a plurality of vertically-elongated hook-receiving apertures. Trailers are manufactured which have vertically-extending columns or posts in the sidewalls. In such trailers the belt rails are recessed in the walls between the columns and are secured to the columns. Depending upon the use of the trailer or container, the belt rails may extend the full length of the sidewall or only a portion thereof (for example, only the rearward section near the door).

Other trailers are manufactured with plywood panels which do not include sidewall columns or posts. In that situation, the belt rails are positioned against the inside wall surface and are riveted thereto.

A decking system 30 is shown which includes a plurality of individual deck panels which can be selectively employed so as to accommodate various size loads. Each deck panel has a hinge, such as 32, at the left-hand side and a latch-support construction 34 at the right-hand end. When in use, each deck panel can be swung downwardly and latched into a horizontal position parallel to the truck floor. When not in use, the deck panel can be swung upwardly and positioned against the wall. Thus by using one or more panel sections and beginning at the front wall of the trailer, various sizes and configurations of loads can be accommodated.

It will be appreciated that the depth of each deck panel is only a fraction of the entire length of the trailer.

The curtain system includes an upper curtain assembly 36 generally and the lower curtain assembly 38 generally.

The upper curtain assembly 36 includes an overhead trolley system 40 which is connected to the ceiling of the trailer so as to permit movement of the curtain assembly 36 longitudinally of the trailer. The assembly also includes adjustable straps or hangers 42 which are secured at one end to the trolley and at the other end to a fabric curtain 44. The fabric curtain includes two laterally-extending belt-receiving pockets 46 and 48, each of which supports and positions tensioning belts 50 and 52. Each of the belts, such as 50 and 52, include hook-like members at the ends thereof to engage the apertures in the respective belt rails, such as 20 and 22.

The lower curtain assembly 38 includes a pair of slider track channels 54 and 56 which are recessed in the sidewalls of the trailer and extend longitudinally thereof, and each channel has an inwardly facing slot, such as 56a. Each of the tracks are positioned below the deck and between the deck and the adjacent lower belt rail 24. A pair of sliders 58 and 60 are provided for slidable movement within the channel.

Referring now to FIGS. 4 and 5, it is seen that the slider 60 is a plate-like member having a link section 62 extending therefrom. The chain 64 is secured at one end to the link section 62 and at the other end to the fabric-type curtain 66. A second chain 68 is provided at the other side of the curtain so that the two chains 64 and 68 cooperate to support and position the curtain. The chain 64 is permanently affixed to the slider and the curtain, while the other chain 68 is permanently affixed to the curtain but is provided with a hook-like member 70 for removable detachment to the slider, such as 58.

The lower curtain includes three belts 72, 74 and 76 for cooperation with the lower belt-receiving rails 24, 26 and 28.

When in use, the trailer is loaded by first placing cargo, such as 78, on the floor at the forwardmost end of the trailer. A decking panel, such as 30, is pulled into the downward horizontal position and an upper container 80 is positioned on the deck-panel. This is done until the loading process is completed. As shown in FIG. 1, the amount of lading on the lower section is not the same as in the upper section and the lower face is rearward of the forward face. When the loading is completed, the curtain assemblies, such as 36 and 38, are moved forwardly until they engage the face of the upper and the lower lading. The hooks at the end of the belts, such as 50, 52, 72, 74 and 76, are secured to the belt rails, and the belts are then tightened so as to securely hold the load.

When the trailer reaches its destination or drop-off point, the buckles are released and the curtain moved to one side so as to permit removal of one or more of the containers.

In order to store the curtain assembly, the upper assembly 36 is slid along the trolley to one side or the other and may be securely fastened to the side.

The lower assembly 38 may be stored by detaching the hook 70 from slider 58 and hooking it into the channel 56. In effect then the lower curtain is stretched out along the sidewall as shown in FIG. 6.

Another manner in which the curtain 38 can be stored is to secure the hook 70 into the slider 60. This causes the curtain 66 to double-back on itself and can be pushed against the sidewall 12 for storage.

It will be appreciated that there may arise occasions in this type of system in which the decking is not employed. In that situation the upper and lower curtain assemblies 36 and 38 can be positioned and aligned with one another so as to provide essentially a single curtain extending from the top wall to the bottom wall of the trailer.

It will be appreciated that numerous changes and modifications can be made to the embodiment shown herein without departing from the spirit and scope of this invention.

What is claimed and desired to be secured by Letters Patent of the United States is:

1. Lading-engaging curtain means for use in a lading-carrying container, such as a truck-trailer, which has a pair of spaced sidewalls, a bottom wall and a top wall, wherein the improvement comprises:
   said vehicle having deck means for positioning in spaced relation to said bottom wall for carrying a load or cargo;
   said curtain means being constructed of a flexible, fabric like material and further including upper curtain means for positioning above said deck means and lower curtain means for positioning below said deck means, restraining belt means cooperatively associated with each of said upper and lower curtain means and adapted for releasable engagement only with said sidewalls for cooperation with said curtain means in restraining longitudinal movement of said lading;
   each of said curtain means constructed to extend transversely of said side top and bottom walls for engaging and restraining lading;
   trolley means adjacent said top wall means for suspending said upper curtain means therefrom and for positioning said upper curtain means across the face of lading carried on said deck means;
   track channel means associated with each of said sidewalls below and adjacent said deck means and extending therealong, each of said channel means including a box-like section having means defining a slot;
   slider means positioned within each of said channels for longitudinal movement therein and having a curtain-connecting portion extending through said slot; and
   said lower curtain means including connector means for securing said curtain to said connecting portion of slider means so as to support and suspend said curtain means from said slider means.

2. A curtain as in claim 1, wherein said connector means includes at least one detachable hook means for disconnecting said curtain from the connecting portion of at least one of said slider means.

3. A curtain as in claim 2, wherein said hook means is constructed for cooperation with one of said side walls of said trailer for storing said curtain means.

4. A curtain as in claim 1, and in combination therewith, a lading-container as in claim 1 having longitudinal belt-rails for cooperation with said belt means and for cooperation with said connector means for storing said curtain means.

* * * * *